US 6,737,976 B2

(12) United States Patent
Rozier et al.

(10) Patent No.: US 6,737,976 B2
(45) Date of Patent: May 18, 2004

(54) METHOD AND SYSTEM FOR MONITORING AIR PRESSURE IN A TELECOMMUNICATIONS NETWORK

(75) Inventors: Ron L. Rozier, Lithonia, GA (US); Philip B. Ashcraft, Cumming, GA (US); Steven W. Smith, Columbus, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/989,329

(22) Filed: Nov. 20, 2001

(65) Prior Publication Data

US 2004/0036616 A1 Feb. 26, 2004

(51) Int. Cl.[7] ............................................. G08B 21/00
(52) U.S. Cl. ............... 340/611; 340/825.21; 340/853.2; 379/37
(58) Field of Search ............... 340/611, 825.21, 340/853.2, 853.3; 73/152.52, 152.51; 379/37–42, 106.01, 106.02

(56) References Cited

U.S. PATENT DOCUMENTS

| 3,800,090 | A | * | 3/1974 | Matena | 179/2 |
| 4,375,763 | A | * | 3/1983 | Hogan | 73/40.5 |
| 4,402,213 | A | * | 9/1983 | Hogan | 73/40.5 |
| 5,261,276 | A | * | 11/1993 | Gifford | 73/302 |
| 5,708,195 | A | * | 1/1998 | Kurisu et al. | 73/40.5 |
| 5,748,104 | A | * | 5/1998 | Argyroudis et al. | 340/870.11 |
| 6,102,665 | A | * | 8/2000 | Centers et al. | 417/18 |
| 6,211,782 | B1 | * | 4/2001 | Sandelman et al. | 340/506 |
| 6,244,824 | B1 | * | 6/2001 | Centers et al. | 417/18 |
| 6,287,657 | B1 | * | 9/2001 | Gebizlioglu | 428/36.91 |
| 6,348,869 | B1 | * | 2/2002 | Ashworth | 340/605 |

OTHER PUBLICATIONS

"System Studies Incorporated Air Pressure Primer," http://www.airtalk.com/primer.shtml, Date of Publication—Unknown, Date of Printing—Thursday, Aug. 30, 2001.
"Cable Air Pressure Monitoring Systems," Sparton Technology, Inc., http://www.sparton.com/cableair.pdf, Date of Publication—Unknown.

* cited by examiner

Primary Examiner—Benjamin C. Lee
Assistant Examiner—Phung Nguyen
(74) Attorney, Agent, or Firm—Bambi F. Walters; Scott Zimmerman

(57) ABSTRACT

A system for monitoring air pressure in a telecommunications network comprises a plurality of monitoring units, at least one device server, a computer network, and a terminal. Each monitoring unit is connected to a device server. A user at the terminal receives air pressure data from the monitoring units over the computer network.

40 Claims, 4 Drawing Sheets

METHOD AND SYSTEM FOR MONITORING AIR PRESSURE IN A TELECOMMUNICATIONS NETWORK

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention relates to methods and systems for monitoring air pressure in a telecommunications network

BACKGROUND

Telecommunications companies strive to keep their underground cables in good working order. One of the biggest threats to underground telephone cables is moisture. The conductors in the cables are insulated, usually with a pulp insulation or plastic.

The integrity of the protective cable sheath is compromised when cracks develop. Cracks allow water to enter and electrolysis to occur, which can result in faulted conductor pairs. The characteristics of the cable can change. For example, the noise on the line may increase or there may be cable failure.

With underground cable, the cable is susceptible to water damage due to groundwater or storm water. If there is a crack in the cable, water will permeate and cause conductor damage unless there is a positive pressure within the cable that exceeds and counters the force of the water.

Telephone companies have utilized air pressure systems to put air into their cables. When a crack develops in the cable, the air pressure inside the cable prevents water or moisture from entering the cable. Air pressure systems may include compressors and dryers, with compressors supplying the air and the dryers removing the residual moisture. Air pipes follow the cable route and introduce pressure at various fixed points along the cable route. The air pipes are connected to manifolds, which distribute air to the cables.

With these air pressure systems, telephone companies want to insure adequate air pressure throughout the system and want to detect leaks in the system. Thus, it is very important to measure the air delivery pressure at various locations within the air pressure system.

Air pressure monitoring units, such as Sparton air pressure monitoring systems commercially available from Sparton Technology, Inc., are available to take air pressure readings. In the past, the air pressure readings from monitoring units have been accessible by computers utilizing dial-up modems. However, accessing the monitoring units using dial-up modems has proven slow and forced reliance on outmoded printers and network technology. For example, the maximum connection speed in some cases has been 2400 bytes per second (bps). Due to the slow connection, the monitoring systems have typically only been polled once a day to obtain status reports.

In the past, technicians would print a status report on paper in the morning before going into the field for the day. If the technicians were in the field and needed an updated status report, they would sometimes leave a work site to return to their office and print out a paper report. In some instances, the technicians may have called someone in the office to print and read the report to them.

For example, a technician may be in the field performing work on a piece of equipment connected to the air pressure system. Examples of equipment that technician might repair in the field include an air pipe, a compressor, a manifold, a transducer, a cable splice closure, air tubes, carrier cases feeding out of cable, transducer housings, fittings for air pipes and air tubes, load coils, check valves, pressure plugs (external and internal), pressure valves, flanges placed on cables, cutoff valves, underground terminals, pressure regulators, or the cable itself. If the technician is adjusting the equipment, the technician may need "real time" pressure readings on the equipment. Under current systems, the technician must call someone in an office or technical center to obtain the data. The office receives real time pressure data from the monitoring unit. A person in the office then reads the real time pressure data to the technician in the field. Thus, under current systems, two people are required to adjust the equipment.

SUMMARY OF THE INVENTION

The present invention provides methods and systems for monitoring air pressure in a telecommunications network. An embodiment of a system for monitoring air pressure in a telecommunications network may comprise a device server. The device server receives air pressure data from an air pressure monitoring unit and deliver the air pressure data to a terminal.

In one embodiment, the air pressure data are delivered to the terminal over a computer network, such as a local area network, an intranet, or the internet. Examples of terminals include, for example, personal computers, laptop computers, personal digital assistants, cellular telephones, and wireless communication devices.

In other embodiments, a system of the present invention comprises a plurality of monitoring units, a plurality of device servers, a computer network, and a terminal. Each monitoring unit is connected to a device server. A user at the terminal is able to receive air pressure data from the monitoring units over the computer network. In some embodiments, each monitoring unit is connected to a different device server. In other embodiments, some monitoring units will have dedicated device servers (i.e., only one monitoring unit per device server) and some monitoring units might share a multi-port device server. In other embodiments, multiple monitoring units may be connected to a single device server.

In one embodiment, the monitoring units measure air pressure in telephone cables. Each monitoring unit may comprise two ports, with a first port connecting the monitoring unit to the computer network and a second port allowing a remote terminal to access the monitoring unit directly (e.g., using a modem). Each monitoring unit may have a unique internet protocol address associated with it to enable a user at a remote terminal to connect to the computer network and receive air pressure data from that particular monitoring unit. In one embodiment, the device server is a multiprotocol, micro serial server that provides Ethernet connections to connect the monitoring unit to the computer network. Examples of terminals include, for example, personal computers, laptop computers, personal digital assistants, cellular telephones, and wireless communication devices.

The present invention also relates to methods for monitoring air pressure in a telecommunications network. In one embodiment, a method of the present invention comprises measuring air pressure in the telecommunications network, accessing a computer network, selecting a monitoring unit from a plurality of air pressure monitoring units, connecting with a device server, and receiving air pressure data from the monitoring unit. In a further embodiment, the air pressure data are printed.

The air pressure monitoring units measure air pressure in telephone cables. In one embodiment, each monitoring unit has a unique internet protocol address associated with it. The computer network may be accessed by connecting to the computer network using, for example, personal computers, laptop computers, personal digital assistants, cellular telephones, and wireless communication devices. In one embodiment, a user may wirelessly connect to the network using a laptop computer.

By using systems and methods of the present invention, the retrieval rate of air pressure data is significantly increased. For example, by using systems of the present invention, technicians can connect to the monitoring units and receive the data at rates of 9600 bps or higher (as compared to 2400 bps using modem connections).

It is a feature and advantage of the present invention to provide systems and methods for monitoring air pressure in a telecommunications network with an increased polling speed over convention methods and systems.

Another feature and advantage of the present invention is to provide systems and methods for monitoring air pressure in a telecommunications network that can poll more frequently due to higher polling speeds.

A further feature and advantage of the present invention is to provide systems and methods for monitoring air pressure in a telecommunications network that allow the retrieval and printing of air pressure data from remote locations. A still further feature and advantage of the present invention is to provide systems and methods for monitoring air pressure in a telecommunications network that allow the printing of status reports to any printer attached to a terminal connected to a company's intranet.

The systems and methods of the present invention also may advantageously provide increased flexibility to technicians in the field. Another feature and advantage of the present invention is to provide systems and methods for monitoring air pressure in a telecommunications network that allow technicians to access data in real time from the field. A further feature and advantage of the present invention is to provide systems and methods for monitoring air pressure in a telecommunications network that allow access to air pressure monitoring units by laptop computers for real time information from the field.

A still further feature and advantage of the present invention is to provide systems and methods for monitoring air pressure in a telecommunications network that enable technicians to retrieve real time information without the assistance of another person in a centralized location.

The systems and methods of the present invention advantageously reduce the amount of time that it takes for technicians to receive monitoring unit data. The systems and methods of the present invention also advantageously increase the efficiency of technicians in the field.

Additional uses, objects, advantages, and novel features of the invention are set forth in the detailed description that follows and will become more apparent to those skilled in the art upon examination of the following or by practice of the invention.

DETAILED DESCRIPTION

Figure 1:
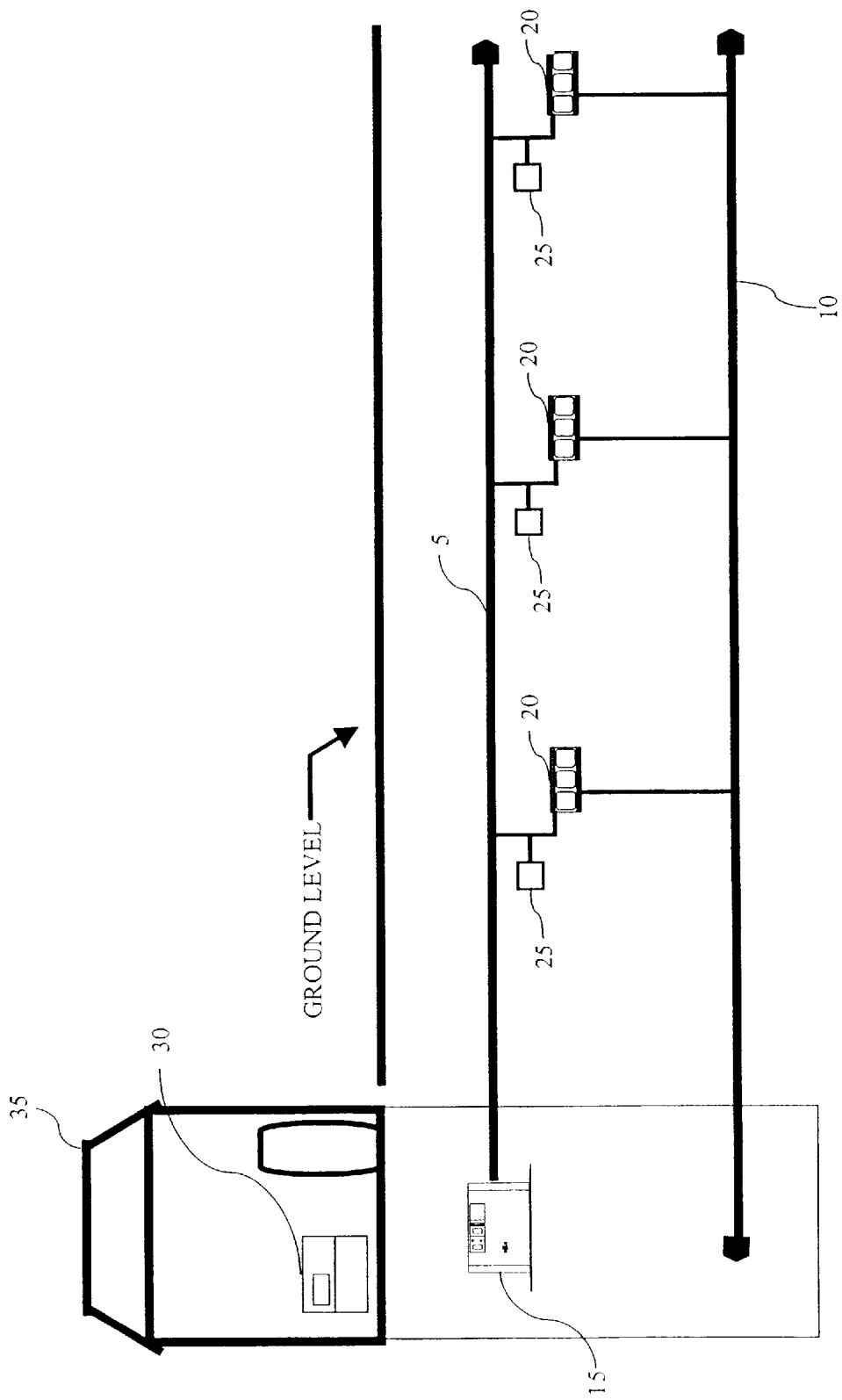
FIG. 1 is a schematic illustrating an air pressure system in which the systems and methods of the present invention may be implemented.

Referring now to the figures, FIG. 1 is a schematic illustrating an air pressure system in which the systems and methods of the present invention may be implemented. As noted above, telephone companies utilize air pressure systems to put air into their cables. In FIG. 1, an air pipe 5 follows a cable 10 underground. The air in the air pipe 5 is generated by a compressor 15. Although not shown in FIG. 1, dryers may be used to remove residual moisture from the air generated. The air pipe 5 is connected to manifolds 20, which distribute air to the cable 10.

Transducers 25 are positioned along the air pipe 5 to measure air pressure. Data relating to the air pressure are sent to a monitoring unit 30. The monitoring unit 30, as shown in FIG. 1, is located at a wire center 35. Embodiments of the present invention may be implemented in systems, such as the one shown in FIG. 1, to retrieve air pressure data from monitoring units.

Figure 2:
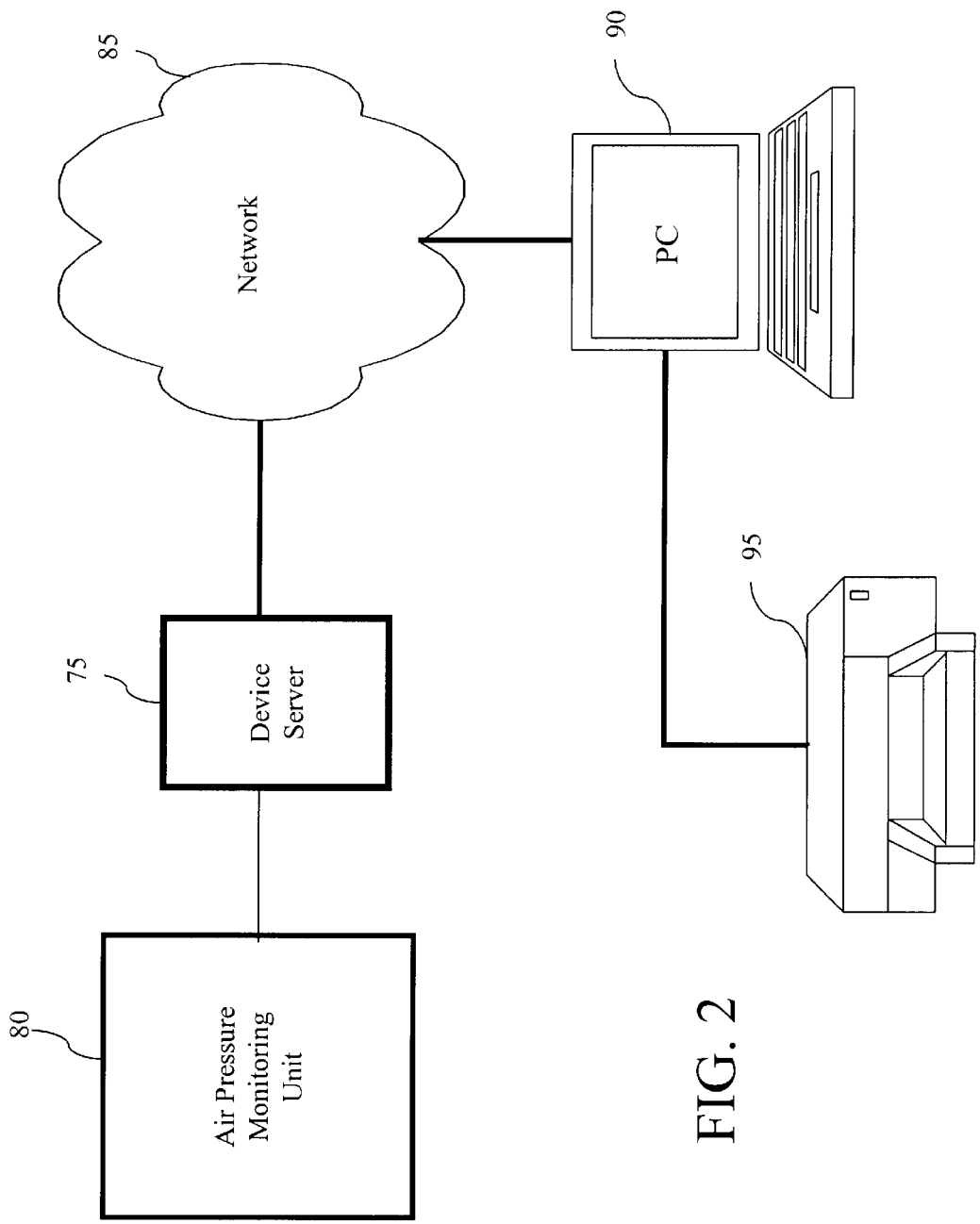
FIG. 2 is a schematic illustrating an embodiment of a system of the present invention for monitoring air pressure in a telecommunications network.

FIG. 2 is a schematic illustrating an embodiment of a system of the present invention for monitoring air pressure in a telecommunications network. In FIG. 2, a device server 75 connects an air pressure monitoring unit 80 to a computer network 85. In FIG. 2, the computer network 85 may be an intranet, a local area network, or the internet. The device server 75 receives air pressure data from the air pressure monitoring unit 80 and delivers the air pressure data to the computer network 85.

Terminals may retrieve the air pressure data by accessing the computer network 85. Examples of terminals include, for example, personal computers, laptop computers, personal digital assistants, cellular telephones, and wireless communication devices. In FIG. 2, the terminal shown is a personal computer 90. The personal computer 90 is in communication with the computer network 85. The air pressure data may be delivered to the personal computer 90 and printed on a printer 95 attached to the personal computer 85 or to a network printer.

To illustrate the operation of a system, such as that shown in FIG. 2, a technician or user may be interested in checking a particular cable for leaks by reviewing air pressure data from various monitoring units. The technician accesses the network 85 from his personal computer 90 and selects the air pressure monitoring units that he wishes to study. The selected monitoring units deliver air pressure data to the personal computer 90 over the network 85. The technician may print the air pressure data on the attached printer 95.

Figure 3:
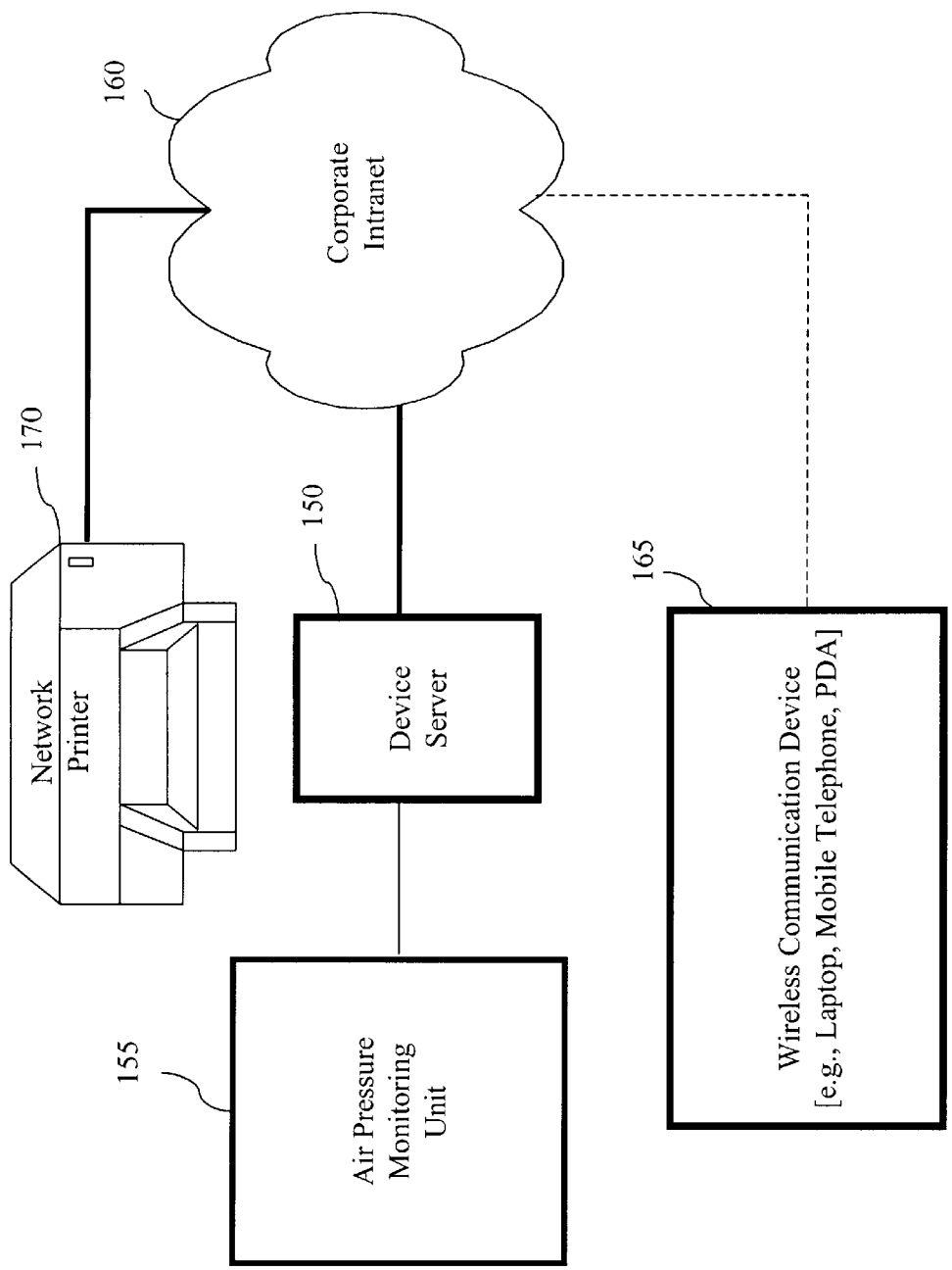
FIG. 3 is a schematic illustrating another embodiment of a system of the present invention for monitoring air pressure in a telecommunications network.

FIG. 3 is a schematic illustrating another embodiment of a system of the present invention for monitoring air pressure in a telecommunications network using a mobile communication device. In FIG. 3, a device server 150 connects an air pressure monitoring unit 155 to a corporate intranet 160. The device server 150 receives air pressure data from the air pressure monitoring unit 155 and delivers the air pressure data to the intranet 160.

A wireless communication device 165 (e.g., a laptop, a mobile telephone, or a personal digital assistant) may retrieve the air pressure data by wirelessly accessing the intranet 160. The wireless communication device 165 may connect to and access the intranet 160 using conventional wireless communication systems, which may include, for example, communications towers, mobile telephone switching offices, and/or an 802.11(a or b) wireless LAN. For example, a laptop may wirelessly access and connect to the intranet using the Cingular Interactive Intelligent Wireless Network, which also other wireless devices, including personal digital assistants, interactive pager systems, etc.

A technician working near a particular monitoring unit 155 may connect to the intranet 160 and receive the air pressure data from that monitoring unit 155 or from any other monitoring unit in the telecommunications system. When the technician selects a particular air pressure monitoring unit 155, the air pressure data is delivered to the wireless communication device 165 over the intranet 160. The technician may advantageously receive real-time air pressure data associated with particular monitoring units.

A network printer 170 is also connected to the intranet 160. The technician may wish to print a hard copy of the air pressure data to the network printer 170 for record-keeping purposes.

Figure 4:
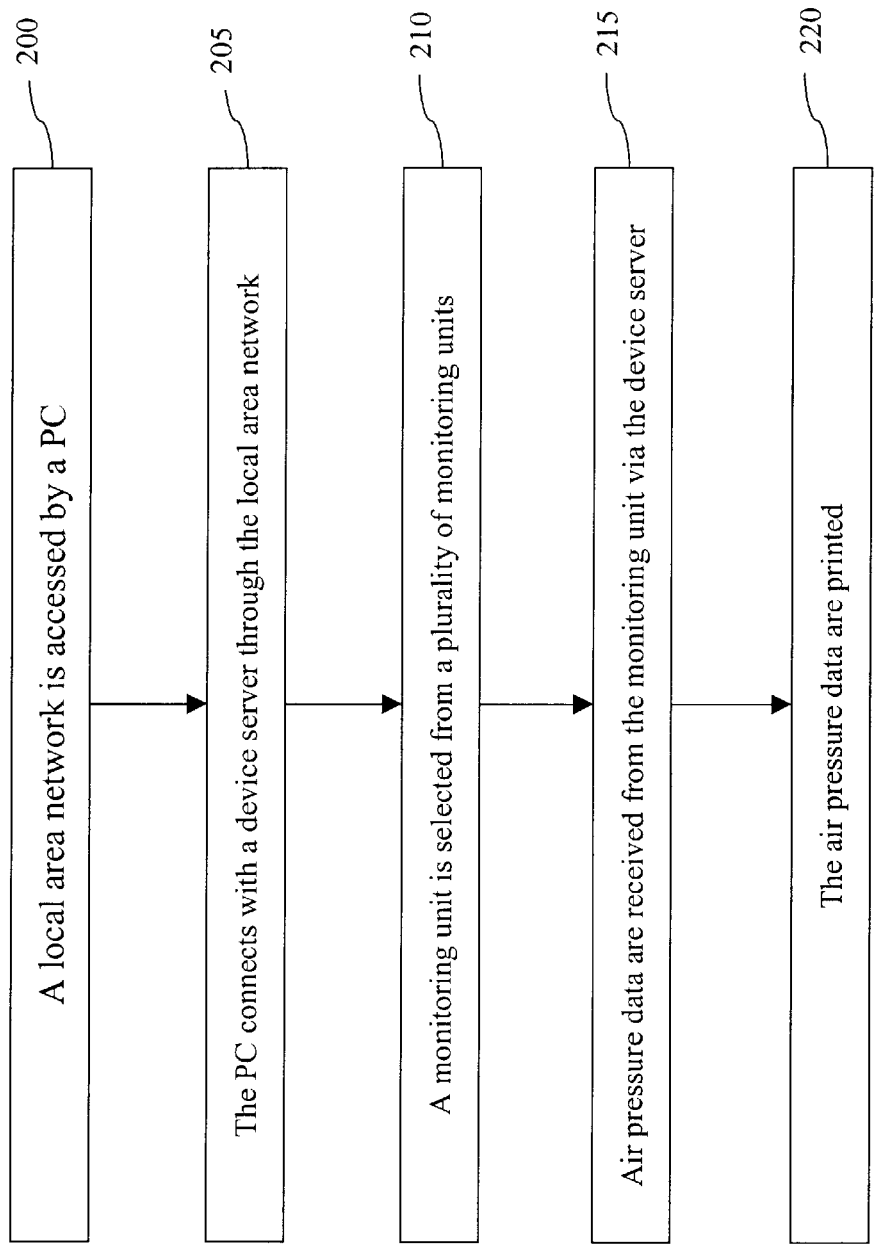
FIG. 4 is a flow chart flowchart illustrating an exemplary method of monitoring air pressure in a telecommunications network.

FIG. 4 is a flow chart flowchart illustrating an exemplary method of monitoring air pressure in a telecommunications network. In the embodiment illustrated, a local area network is accessed 200 by a personal computer. An air pressure monitoring unit 205 is selected from a plurality of monitoring units. The personal computer connects 210 with a device server through the local area network. Air pressure data are received 215 from the monitoring unit via the device server and are printed 220.

Examples of air pressure monitoring units useful in the present invention include Sparton monitoring units, Chatlos monitoring units, and Hercules monitoring units. Each wire center having pressurized cable in the telecommunications system may have an air pressure monitoring unit. Each monitoring unit preferably has at least two ports. One port is preferably dedicated to the local area network or intranet. The air pressure monitoring unit is connected to a device server through this port. The air pressure data is delivered to the local area network or intranet from the air pressure monitoring unit through the device server.

In this embodiment, each monitoring unit is assigned an internet protocol (IP) address. With an IP address assigned to each monitoring unit, a user may request air pressure data for specific monitoring units using the IP address. Each monitoring unit also has its own device server in this embodiment.

In other embodiments, multiple monitoring units may be connected to a single, multi-port device server. For example, if a wire center has more than one monitoring unit, then a single device server may be used. In this embodiment, each monitoring unit is still addressed as a separate unit using its own IP address.

Each monitoring unit may have an assigned telephone number. A second port may therefore be dedicated to dial-up connections. In other words, a user at a remote terminal (e.g., a laptop computer) may directly access the monitoring unit to retrieve the air pressure data, rather than requesting the data using the intranet or local area network.

The device server may be a multiprotocol, micro serial server. The device server may provide Ethernet connections to connect the air pressure monitoring units to the network. Examples of device servers useful in the present invention include Lantronix Model No. MSS1 device servers commercially available from Lantronix, Inc., Model IOLAN+ 102/104 serial servers commercially available from Perle Systems Limited, and other multiprotocol, micro serial servers that provide Ethernet connections for personal computers, terminals, modems, and devices that would not otherwise be connected to a network.

As noted above, the network may be a local area network, an intranet, or the internet. In addition to a personal computer, examples of other terminals that may connect to the network include, for example, laptop computers, personal digital assistants, cellular telephones, and wireless communication devices. Wireless connections to a corporate intranet are advantageous because they enable technicians working in the field to retrieve air pressure data at the work site. For example, a technician working on a compressor may wirelessly connect to the intranet with a laptop computer to determine if the adjustments had the intended effect on the air pressure. Further, technicians may obtain real-time data in the field whereas in the past, the technicians needed to call into an office and have another person read the data to them.

The technicians can dialup using a secure dialup system and secure identification and connect to the monitoring units. The technicians may be given dialup access cards. By obtaining the air pressure data through a connection with the network, the technicians can connect to any monitoring unit. In the past, if a technician was connected to a particular air pressure monitoring unit and wanted to connect to another monitoring unit, the technician would have to disconnect from the first monitoring unit and dial the telephone number associated with the second monitoring unit.

The air pressure data may be printed on any number of printers, such as network printers and printers connected to a terminal connected to the network. Thus, the data may be printed at any number of locations and not just from a central computer where the data were typically received.

An embodiment of the invention includes a computer-readable medium, having computer-readable instructions for accessing a computer network, for selecting an air pressure monitoring unit from a plurality of air pressure monitoring units, and for receiving air pressure data from the computer network. The computer network may be, for example, a local area network, an intranet, or the internet.

Another embodiment of the present invention includes a computer-readable medium having computer readable instructions for selecting an air pressure monitoring unit from a plurality of air pressure monitoring units, for receiving air pressure data from the selected air pressure monitoring units, and for delivering the air pressure data to a terminal. The terminal may be, for example, a personal computer, a laptop computer, a personal digital assistant, and/or a wireless communication device.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

That which is claimed:

1. A system for monitoring air pressure in a telecommunications network, comprising:

a terminal in communication with a device server, the terminal communicating a signal to select a monitoring unit to retrieve real-time air pressure data associated with the selected monitoring unit; and the device server, wherein the device server receives the signal from the terminal and in response to the signal, the device server retrieves the real-lime air pressure data from the selected monitoring unit and communicates the real-time air pressure data to the terminal, wherein the terminal is located proximate to a work site and wherein the monitoring unit is associated with the work site.

2. The system of claim 1, wherein the device server is a multiprotocol server.

3. The system of claim 1, wherein the real-time air pressure data is communicated to the terminal over a computer network.

4. The system of claim 3, wherein the network is a local area network.

5. The system of claim 3, wherein the network is an intranet.

6. The system of claim 1, wherein the terminal is a personal computer.

7. The system of claim 1, wherein the terminal is a laptop computer.

8. The system of claim 1, wherein the terminal is a personal digital assistant.

9. The system of claim 1, wherein the terminal is a wireless communication device.

10. The system of claim 1, wherein the device server receives air pressure data from at least two monitoring units.

11. The system of claim 10, wherein the device server is a multi-port device server.

12. A system for monitoring air pressure in a telecommunications network, comprising:
   a plurality of monitoring units;
   a plurality of device servers;
   a computer network, the plurality of device servers connected to the computer network; and
   a terminal in communication with the device server, the terminal communicating a signal to select a monitoring unit from the plurality of monitoring units to retrieve real-time air pressure data associated with the selected monitoring unit,
wherein each of the plurality of monitoring units is connected to a device server and the terminal receives real-time air pressure data from one or more selected monitoring units over the computer network, wherein the terminal is located proximate to a work site, and wherein the monitoring unit is associated with the work site.

13. The system of claim 12, wherein the monitoring units measure air pressure in telephone cables.

14. The system of claim 12, wherein each monitoring unit comprises two ports.

15. The system of claim 14, wherein the first port connects the monitoring unit to the computer network.

16. The system of claim 15, wherein the second port allows a remote terminal to access the monitoring unit.

17. The system of claim 12, wherein each monitoring unit has a unique internet protocol address.

18. The system of claim 12, wherein each device server is a multiprotocol server.

19. The system of claim 12, wherein the device servers provide Ethernet connections to connect the monitoring units to the network.

20. The system of claim 12, wherein each device server is dedicated to a single monitoring unit.

21. The system of claim 12, wherein the terminal is personal computer.

22. The system of claim 12, wherein the terminal is a laptop computer.

23. The system of claim 22, wherein the laptop computer's connection to the network is wireless.

24. The system of claim 12, wherein the terminal is a personal digital assistant.

25. The system of claim 12, further comprising a printer.

26. The system of claim 25, wherein the printer is connected to the terminal.

27. The system of claim 25, wherein the printer is connected to the computer network.

28. A system for monitoring air pressure in a telecommunications network, comprising:
   means for a terminal to access a computer network;
   means for the terminal to select an air pressure monitoring unit from a plurality of air pressure monitoring units;
   means for querying the selected air pressure monitoring unit for real time air pressure data; and
   means for communicating the real-time air pressure data from the selected air pressure monitoring units over the computer network to the terminal,
wherein the terminal is located proximate to a work site and wherein the monitoring unit is associated with the work site.

29. A method for monitoring air pressure in a telecommunications network, comprising:
   accessing a computer network having at least one device server;
   selecting an air pressure monitoring unit from a plurality of air pressure monitoring units;
   querying the selected air pressure monitoring unit for real time air pressure data;
   measuring air pressure via the selected air pressure monitoring unit in the telecommunications network; and
   communicating the real time air pressure data from the selected air pressure monitoring unit over the computer network to the terminal,
wherein the terminal is located proximate to a work site and wherein the monitoring unit is associated with the work site.

30. The method of claim 29, wherein the air pressure monitoring units measure air pressure in telephone cables.

31. The method of claim 29, wherein each monitoring unit has a unique internet protocol address.

32. The method of claim 29, wherein accessing a computer network comprises connecting to the network from a laptop.

33. The method of claim 32, wherein the connection to the network is wireless.

34. The method of claim 29, wherein the data are air pressure data.

35. The method of claim 29, further comprising printing the received data.

36. The method of claim 35, wherein the data are air pressure data.

37. The system of claim 29, wherein the device server is dedicated to a single monitoring unit.

38. A computer-readable medium on which is encoded computer program code for monitoring air pressure in a telecommunications network, comprising:
   computer program code for accessing a computer network having at least one device server;
   computer program code for selecting an air pressure monitoring unit from a plurality of air pressure monitoring units;
   computer program code for querying the selected air pressure monitoring unit for real time air pressure data; and
   computer program code for communicating the real time air pressure data from the selected air pressure monitoring units over the computer network to the terminal, wherein the terminal is located proximate to a work site and wherein the monitoring unit is associated with the work site.

39. The computer-readable medium of claim 38, wherein the computer network is a local area network.

40. The computer-readable medium of claim 38, wherein the computer network is an intranet.

* * * * *